(12) United States Patent
Lin et al.

(10) Patent No.: US 12,401,159 B2
(45) Date of Patent: Aug. 26, 2025

(54) DETECTION DEVICE AND DETECTION METHOD FOR DETECTING WHETHER M.2 DEVICE IS COUPLED TO M.2 CONNECTOR

(71) Applicant: Wiwynn Corporation, New Taipei (TW)

(72) Inventors: Che-Wei Lin, New Taipei (TW); Kuo-Hua Tsai, New Taipei (TW); Sheng-Ting Tsai, New Taipei (TW)

(73) Assignee: WIWYNN CORPORATION, New Taipei (TW)

( * ) Notice: Subject to any disclaimer, the term of this patent is extended or adjusted under 35 U.S.C. 154(b) by 872 days.

(21) Appl. No.: 17/666,953

(22) Filed: Feb. 8, 2022

(65) Prior Publication Data

US 2023/0124249 A1 Apr. 20, 2023

(30) Foreign Application Priority Data

Oct. 15, 2021 (TW) ................................. 110138253

(51) Int. Cl.
*H01R 13/66* (2006.01)
*H01R 13/04* (2006.01)
*H01R 13/641* (2006.01)

(52) U.S. Cl.
CPC ........... *H01R 13/641* (2013.01); *H01R 13/04* (2013.01); *H01R 13/6683* (2013.01)

(58) Field of Classification Search
CPC .. H01R 13/641; H01R 13/04; H01R 13/6683; H01R 13/665; G06F 13/4081
See application file for complete search history.

(56) References Cited

U.S. PATENT DOCUMENTS

| 10,082,842 B1* | 9/2018 | Looi ...................... G06F 13/409 |
| 2021/0170891 A1* | 6/2021 | Lee ........................ H02J 7/0044 |

FOREIGN PATENT DOCUMENTS

| TW | 202123186 A | 6/2021 | |
| WO | WO-2013162816 A1 * | 10/2013 | ............... G06F 1/30 |

OTHER PUBLICATIONS

Chinese language office action dated Jul. 1, 2022, issued in application No. TW 110138253.

* cited by examiner

*Primary Examiner* — William B Partridge
*Assistant Examiner* — Erik A. Anderson
(74) *Attorney, Agent, or Firm* — McClure, Qualey & Rodack, LLP (57) ABSTRACT

A detection device adapted to a connector is provided herein. The connecter includes a first pin and a second pin, and the first pin and the second pin are physically separated and coupled to a first power respectively. The detection device includes a first transistor, a first resistor, a second transistor, and a bias circuit. The first transistor is coupled between the first pin and the first power. The first resistor is coupled between a gate terminal of the first transistor and the first power. A detection signal is generated at the gate terminal of the first transistor. The second transistor is coupled between the gate terminal of the first transistor and a second power. The bias circuit is coupled between a gate terminal of the second transistor and the first pin.

23 Claims, 6 Drawing Sheets

DETECTION DEVICE AND DETECTION METHOD FOR DETECTING WHETHER M.2 DEVICE IS COUPLED TO M.2 CONNECTOR

CROSS REFERENCE TO RELATED APPLICATIONS

This application claims priority of Taiwan Patent Application No. 110138253, filed on Oct. 15, 2021, the entirety of which is incorporated by reference herein.

BACKGROUND OF THE INVENTION

Field of the Invention

The disclosure is generally related to a detection device and a detection method, and more particularly it is related to a detection device and a detection method for detecting whether an M.2 device is coupled to an M.2 connector.

Description of the Related Art

Since the standard M.2 pin definition does not specify a presence pin, it is unable to distinguish whether an M.2 connector is coupled to an M.2 device when the system is running, so that a determination method of an additional current sensor with calculation in firmware is required to determine whether an M.2 device is correctly inserted into the M.2 connector.

However, the determination method of the additional current sensor with calculation performed in firmware has problems with current instability and poor detection sensitivity for low current, and many unexpected problems often occur. Therefore, it is necessary to optimize the detection device and detection method for detecting whether an M.2 device is correctly coupled to the M.2 connector.

BRIEF SUMMARY OF THE INVENTION

The embodiment of the invention proposes a detection device and a detection method for detecting whether the M.2 device is electrically connected to the M.2 connector correctly. By connecting a detection device to any pin (i.e., the supply voltage pin or the ground pin), the function of detecting whether the M.2 device is electrically connected to the M.2 connector can be completed without sacrificing any pin. In addition, when it is determined that the M.2 device is not electrically connected to the M.2 connector, the power being provided to the M.2 connector and the M.2 device is stopped, which helps to reduce power consumption. Furthermore, the detection device and detection method proposed in the embodiments of the invention may also achieve the functions of hot plug and plug-and-play.

In an embodiment, a detection device adapted to a connector is provided herein. The connecter comprises a first pin and a second pin, and the first pin and the second pin are physically separated and coupled to a first power respectively. The detection device comprises a first transistor, a first resistor, a second transistor, and a bias circuit. The first transistor is coupled between the first pin and the first power. The first resistor is coupled between a gate terminal of the first transistor and the first power. A detection signal is generated at the gate terminal of the first transistor. The second transistor is coupled between the gate terminal of the first transistor and a second power. The bias circuit is coupled between a gate terminal of the second transistor and the first pin.

In another embodiment, a detection method adapted to a connector is provided. The detection method comprises detecting whether a device is electrically connected to the connector through one of a plurality of pins to generate a detection signal by a detection device; determining whether the device is electrically connected to the connector according to the detection signal; and controlling a power switch to power the device in response to a connection state between the device and the connector.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It would be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It is understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

Figure 1:
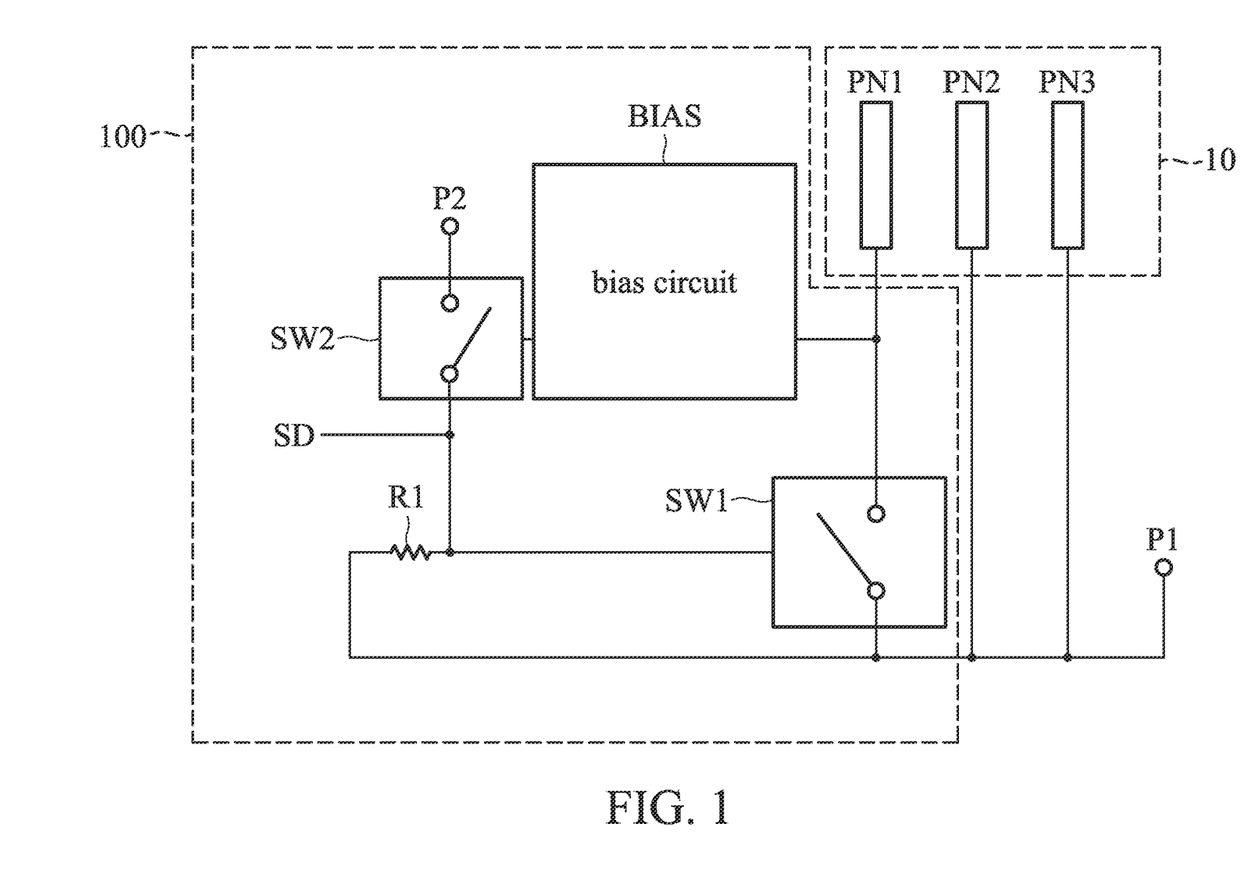
FIG. 1 shows a block diagram of a detection device in accordance with an embodiment of the invention.

FIG. 1 shows a block diagram of a detection device in accordance with an embodiment of the invention. As shown in FIG. 1, the connector 10 includes a first pin PN1, a second pin PN2, and a third pin PN3, and the detection device 100 is coupled between the first pin PN1 and the first power source P1. According to some embodiments of the invention, the connector 10 is coupled to the first power source P1 through the first pin PN1, the second pin PN2, and the third pin PN3. According to an embodiment of the invention, the connector 10 is an M.2 connector.

M.2 is specification of the external dimensions and electrical interface of pins in the expansion card inside the computer and the related connectors, which is a new physical layout and connectors for replacing Mini PCI Express and mSATA interface standards. M.2 was developed by the PCI-SIG and SATA-IO standard organizations, which is defined in the PCI-SIG M.2 and SATA Rev. 3.2 specifications. M.2 has officially renamed in 2013, which is originally called NGFF (Next Generation Form Factor). Thus, many people still call it as M.2 NGFF.

According to some embodiments of the invention, since the connector 10 includes a plurality of pins coupled to the first power source P1, only three pins, the first pin PN1, the second pin PN2, and the third pin PN3, are illustrated herein, but not intended to limit the number of pins thereto. According to an embodiment of the invention, when an external device (not shown in FIG. 1) is correctly coupled to the connector 10, the first power P1 is simultaneously supplied to the external device through the first pin PN1, the second pin PN2, and the third pin PN3. In other words, when the external device is correctly coupled to the connector 10, the first pin PN1, the second pin PN2, and the third pin PN3 are electrically connected to one another through the internal connection of the external device. According to an embodiment of the invention, the connector 10 is an M.2 connector, and the external device is an M.2 device.

According to other embodiments of the invention, the detection device 100 may also be coupled between the second pin PN2 and the first power source P1, or between the third pin PN3 and the first power source P1. In other words, the detection device 100 may be coupled between any pin of the connector 10 and the power that the connector 10 receives. FIG. 1 merely illustrates that the detection device 100 is coupled to the first pin PN1 and the first power source P1 for explanation, but not intended to be limited thereto. In addition, the connector 10 may have any number of pins coupled to the first power source P1.

As shown in FIG. 1, the detection device 100 includes a first switch SW1, a first resistor R1, a second switch SW2, and a bias circuit BIAS. The first switch SW1 is coupled between the first pin PN1 and the first power source P1, and is controlled according to the detection signal SD. The first resistor R1 is coupled between the detection signal SD and the first power source P1. The second switch SW2 is coupled between the second power source P2 and the detection signal SD. The bias circuit BIAS detects the voltage of the first pin PN1 and controls the second switch SW2. According to some embodiments of the invention, the first switch SW1 and the second switch SW2 are implemented by transistors respectively.

Figure 2:
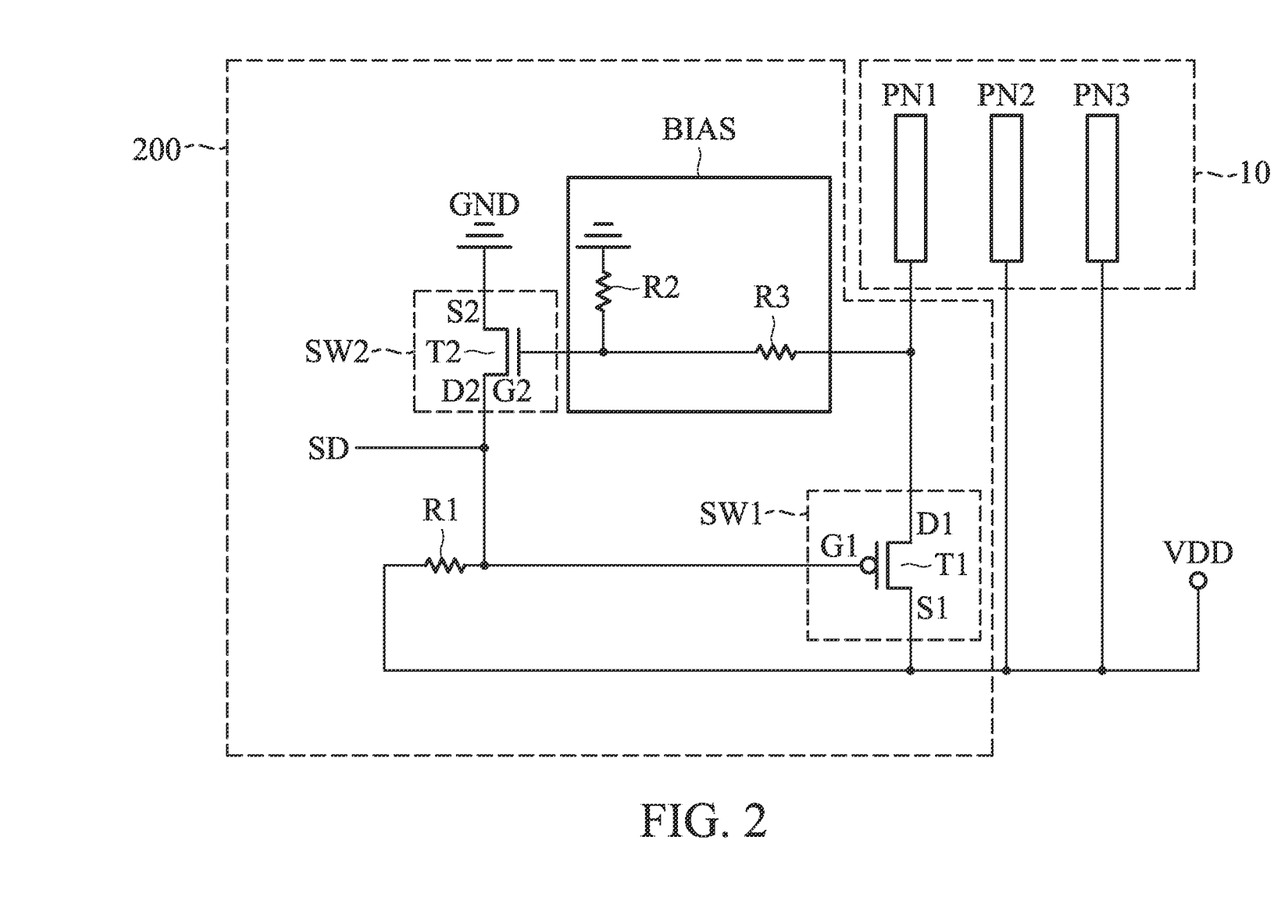
FIG. 2 shows a circuit diagram of a detection device in accordance with an embodiment of the invention.

FIG. 2 shows a circuit diagram of a detection device in accordance with an embodiment of the invention. Comparing the detection device 200 of FIG. 2 with the detection device 100 of FIG. 1, the first power source P1 is at the supply voltage VDD, and the second power source P2 is at the ground level GND. The first switch SW1 includes the transistor T1 and the second switch SW2 includes a second transistor T2, in which the first transistor T1 is a P-type transistor and the second transistor T2 is an N-type transistor.

The first transistor T1 includes a first source terminal S1, a first drain terminal D1, and a first gate terminal G1. The first source terminal S1 is coupled to the supply voltage VDD, the first drain terminal D1 is coupled to the first pin PN1, and the detection signal SD is generated at the first gate terminal G1. The second transistor T2 includes a second source terminal S2, a second drain terminal D2, and a second gate terminal G2. The second source terminal S2 is coupled to the ground level GND, and the second drain terminal D2 is coupled to the detection signal SD.

As shown in FIG. 2, the bias circuit BIAS includes a second resistor R2 and a third resistor R3. The second resistor R2 is coupled between the ground terminal GND and the second gate terminal G2 of the second transistor T2, and the third resistor R3 is coupled between the second gate terminal G2 and the first pin PN1. According to an embodiment of the invention, the second resistor R2 is greater than the third resistor R3, so that the second transistor T2 can be turned on.

According to an embodiment of the invention, when the external device is not electrically coupled to the connector 10, since the first pin PN1 is not directly coupled to the supply voltage VDD, the first pin PN1 is in a floating state and electrically separated from the second pin PN2 and the third pin PN3. The second resistor R2 provides the ground level GND to the second gate terminal G2 of the second transistor T2, so that the second transistor T2 is turned off. The first resistor R1 provides the supply voltage VDD to the detection signal SD, and the first transistor T1 is turned off according to the detection signal SD being the supply voltage VDD.

In other words, when the external device is not electrically coupled to the connector 10 so that the first pin PN1 is electrically separated from the second pin PN2 and the third pin PN3, the first transistor T1 and the second transistor T2 are turned off and the detection signal SD is at the high logic level.

According to another embodiment of the invention, when an external device is electrically coupled to the connector 10, the first pin PN1, the second pin PN2, and the third pin PN3 are coupled to one another through the internal connection of the external device. In other words, the supply voltage VDD is provided to the first pin PN1 via the second pin PN2 (and/or the third pin PN3) and the internal connection of the external device. Then, the second resistor R2 and the third resistor R3 divide the supply voltage VDD of the first pin PN1 to turn on the second transistor T2, so that the second transistor T2 pulls down the detection signal SD to the ground level GND. According to an embodiment of the invention, the resistance value of the second resistor R2 is smaller than the resistance value of the third resistor R3, so that the second transistor T2 is able to be turned on.

In addition, the first transistor T1 is turned on according to the detection signal SD at the ground level GND, so that the first transistor T1 provides the supply voltage VDD to the first pin PN1. In other words, when the external device is electrically coupled to the connector 10, the first transistor T1 and the second transistor T2 are turned on, the detection signal SD is at a low logic level, and the first transistor T1 provides the voltage VDD to the first pin PN1.

Figure 3:
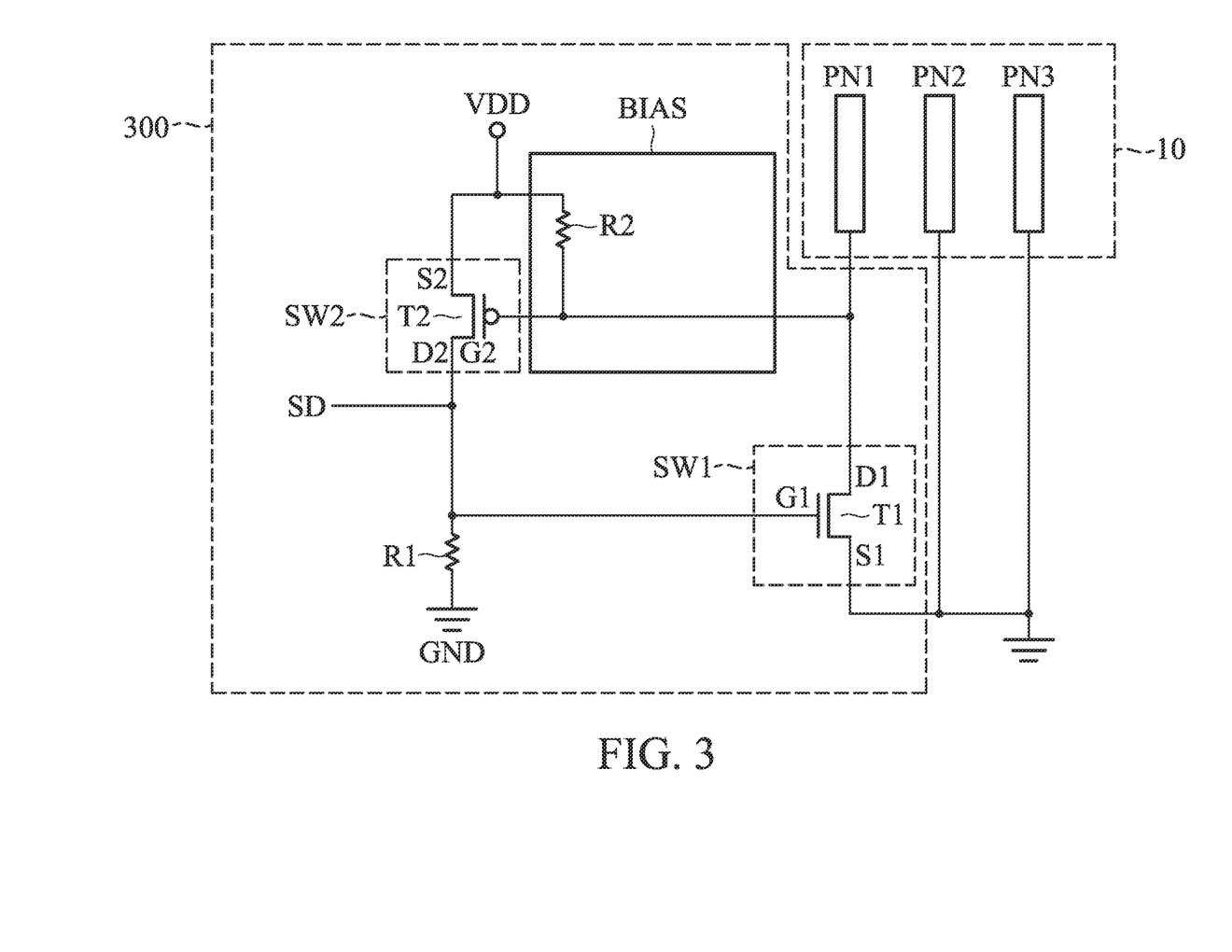
FIG. 3 shows a circuit diagram of a detection device in accordance with another embodiment of the invention.

FIG. 3 shows a circuit diagram of a detection device in accordance with another embodiment of the invention.

Comparing the detection device 300 of FIG. 3 with the detection device 100 of FIG. 1, the first power source P1 is at the ground level GND, the second power source P2 is the supply voltage VDD, the first switch SW1 includes the first transistor T1, and the second switch SW2 include a second transistor T2. The first transistor T1 is an N-type transistor, and the second transistor T2 is a P-type transistor.

The first transistor T1 includes a first source terminal S1, a first drain terminal D1, and a first gate terminal G1. The first source terminal S1 is coupled to the ground level GND, the first drain terminal D1 is coupled to the first Pin PN1, and the first gate terminal G1 is coupled to the detection signal SD. The second transistor T2 includes a second source terminal S2, a second drain terminal D2, and a second gate terminal G2. The second source terminal S2 is coupled to the supply voltage VDD, the second drain terminal D2 is coupled to the detection signal SD, and the second gate terminal G2 is coupled to the first pin PN1. As shown in FIG. 3, the bias circuit BIAS includes a second resistor R2, in which the second resistor R2 is coupled between the supply voltage VDD and the second gate terminal G2.

According to an embodiment of the invention, when the external device is not electrically coupled to the connector 10, since the first pin PN1 is not directly connected to the ground level GND, the first pin PN1 is in a floating state and electrically separated from the second pin PN2 and the third pin PN3. The second resistor R2 provides the supply voltage VDD to the second gate terminal G2 of the second transistor T2, so that the second transistor T2 is turned off. The first resistor R1 pulls the detection signal SD down to the ground level GND, and the first transistor T1 is turned off according to the detection signal SD at the ground level GND. In other words, when the external device is not electrically coupled to the connector 10, the first transistor T1 and the second transistor T2 are turned off, and the detection signal SD is at a low logic level.

According to another embodiment of the invention, when an external device is electrically coupled to the connector 10, the first pin PN1, the second pin PN2, and the third pin PN3 are coupled to one another through the internal connection of the external device. In other words, the ground level GND is provided to the first pin PN1 through the second pin PN2 (and/or the third pin PN3) and the external device. The second transistor T2 is turned on according to the ground level GND of the first pin PN1 to provide the supply voltage VDD to the detection signal SD.

In addition, the first transistor T1 is turned on according to the detection signal SD at the supply voltage VDD, so that the first transistor T1 couples the first pin PN1 to the ground level GND. In other words, when the external device is electrically coupled to the connector 10, the first transistor T1 and the second transistor T2 are turned on, the detection signal SD is at the high logic level, and the first transistor T1 couples the first pin PN1 to the ground level GND.

Figure 4:
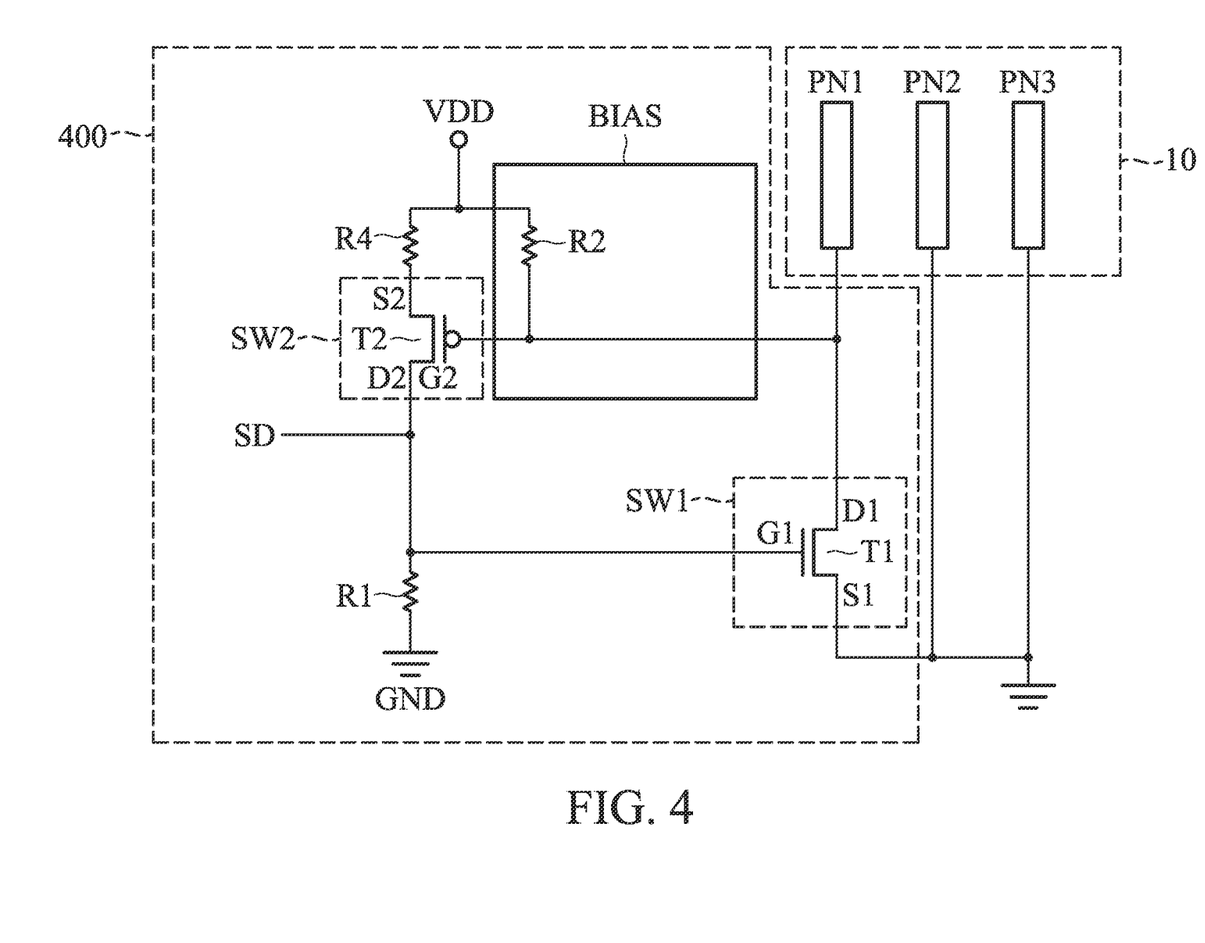
FIG. 4 shows a circuit diagram of a detection device in accordance with another embodiment of the invention.

FIG. 4 shows a circuit diagram of a detection device in accordance with another embodiment of the invention. Comparing the detection device 400 in FIG. 4 with the detection device 300 in FIG. 3, the detection device 400 further includes a fourth resistor R4, in which the fourth resistor R4 is coupled between to the supply voltage VDD and the second source terminal of the second transistor T2. According to an embodiment of the invention, the resistance value of the fourth resistor R4 is less than the resistance value of the first resistor R1, so that the detection signal SD is able to be pulled up to the supply voltage VDD.

Figure 5:
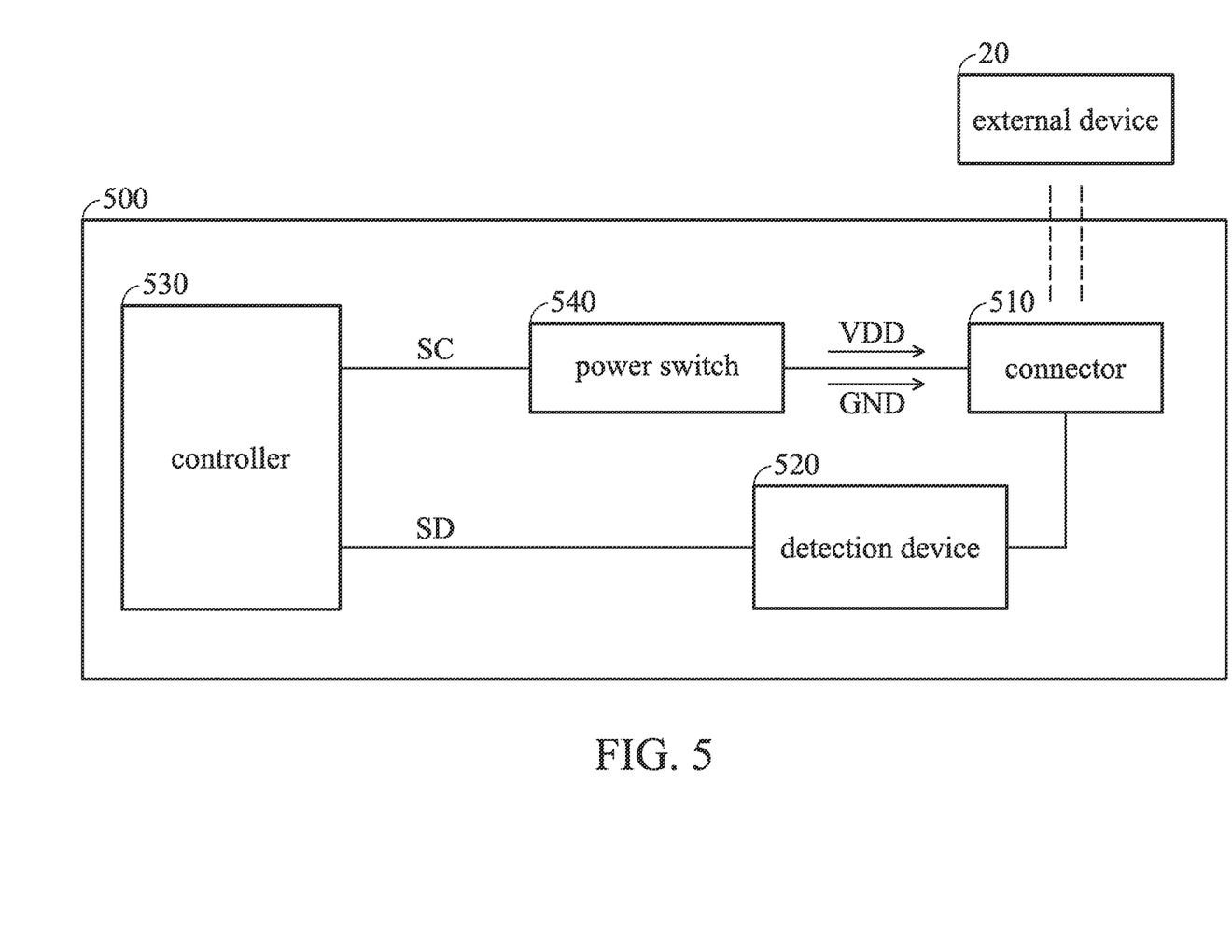
FIG. 5 shows a block diagram of an electronic device in accordance with an embodiment of the invention.

FIG. 5 shows a block diagram of an electronic device in accordance with an embodiment of the invention. As shown in FIG. 5, the electronic device 500 includes a connector 510, a detection device 520, a controller 530, and a power switch 540. The connector 510 is configured to be coupled to the external device 20. According to an embodiment of the invention, the connector 510 is an M.2 connector, and the external device 20 is an M.2 device. The detection device 520 is electrically coupled to the connector 510 for detecting whether the external device 20 is electrically coupled to the connector 510 to generate a detection signal SD. According to some embodiments of the invention, the detailed detection method of the detection device 520 is shown in FIGS. 1-4, where the connector 510 in FIG. 5 corresponds to the connector 10 in FIGS. 1-4, and the detailed actions will not be repeated herein.

The controller 530 determines whether the external device 20 is electrically coupled to the connector 510 according to the detection signal SD generated by the detection device 520, and controls the power switch 540 via the control signal SC. According to an embodiment of the invention, when the controller 530 determines that the external device 20 is electrically coupled to the connector 510 according to the detection signal SD, the power switch 540 provides the supply voltage VDD and the ground level GND to the connector 510 according to the control signal SC generated by the controller 530 so that the external device 20 operates normally. According to another embodiment of the invention, when the controller 530, according to the detection signal SD, determines that the external device 20 is not electrically coupled to the connector 510, the power switch 540 stops supplying the supply voltage VDD and the ground level GND to the connector 510 to reduce power loss.

According to some embodiments of the invention, the detection device 520 continuously detects whether the external device 20 is electrically coupled to the connector 510. Once the external device 20 is separated from the connector 510, the power switch 540 stops providing the supply voltage VDD and the ground level GND. Therefore, the electronic device 500 may implement functions of hot plug and plug-and-play.

According to another embodiment of the invention, when the electronic device 500 is powered on, the power switch 540 immediately supplies the supply voltage VDD and the ground level GND to the connector 510, and the detection device 520 detects whether the external device 20 is coupled to the connector 510. Once the detection device 520 detects that the external device 20 is separated from the connector 510, the power switch 540 then stops providing the supply voltage VDD and the ground level GND. When the detection device 520 detects that the external device 20 is electrically coupled to the connector 510, the power switch 540 continuously provides the supply voltage VDD and the ground level GND to the connector 510.

Figure 6:
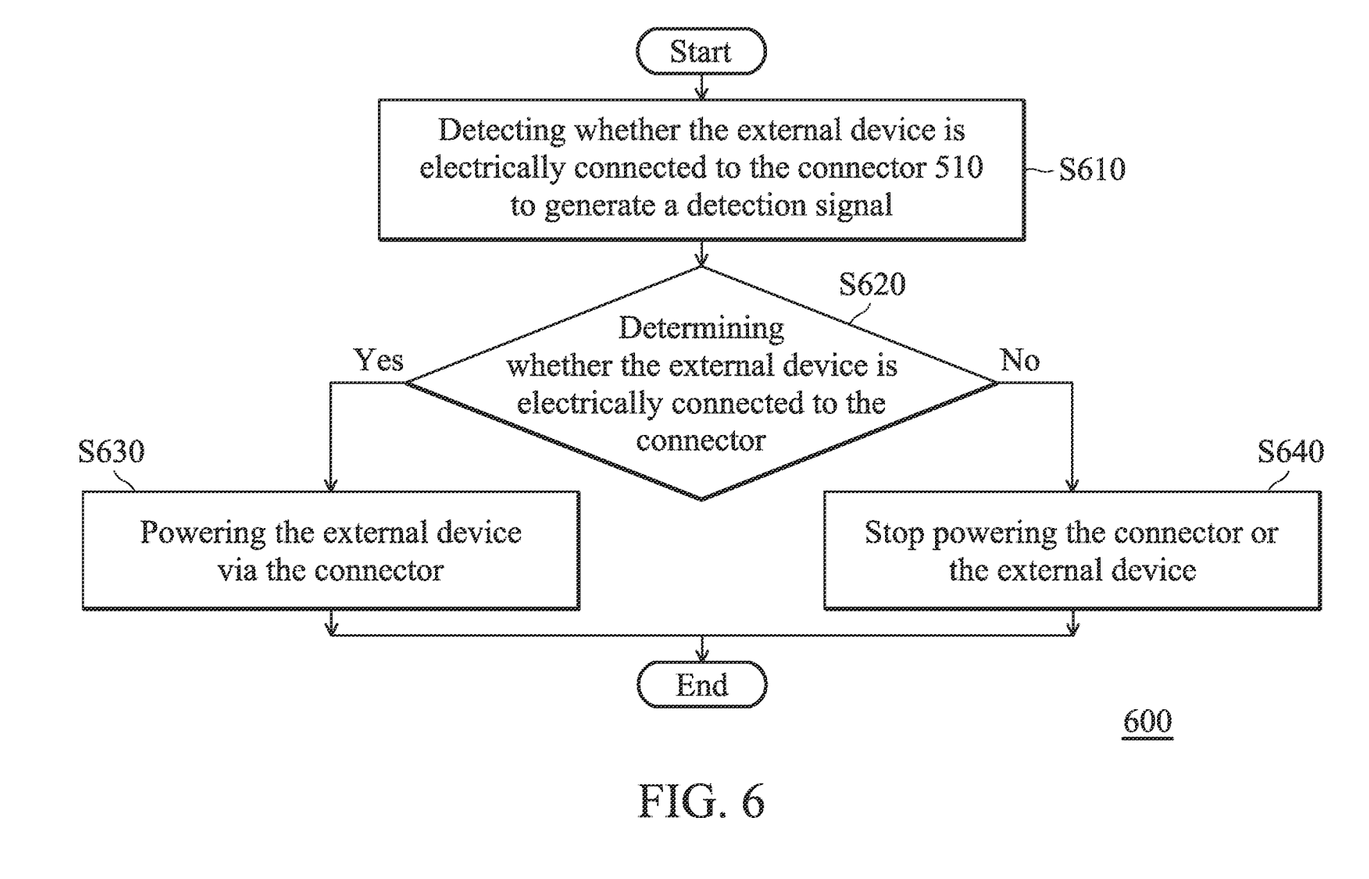
FIG. 6 shows a flow chart of a detection method according to an embodiment of the invention.

FIG. 6 shows a flow chart of a detection method according to an embodiment of the invention, in which the detection method 600 is used to detect whether an external device is electrically coupled to the connector. The following description of the detection method 600 in FIG. 6 will be combined with the block diagram in FIG. 5 for detailed description.

First, the detection device 520 detects that whether the external device 20 is electrically connected to the connector 510 and generates a detection signal SD (step S610). According to the detection signal SD, the controller 530 determines that whether the external device 20 is electrically connected to the connector 20 (step S620). When it is determined that the external device 20 is electrically connected to the connector 510, the power switch 540 is controlled to power the external device 20 via the connector 510 by using the control signal SC (step S630). When it is determined that the external device 20 is not electrically connected to the connector 510, the power switch 540 is controlled to stop powering the connector 510 or the external device 20 (step S640).

In other words, when it is determined that the external device 20 is electrically connected to the connector 510, the power switch 540 provides the supply voltage VDD and the ground level GND to the connector 510 for powering the external device 20. When it is determined that the external device 20 is not electrically connected to the connector 510, the power switch 540 immediately stops providing the supply voltage VDD and the ground level GND to the connector 510 and stops powering the external device 20.

According to an embodiment of the invention, before step S610, when the electronic device 500 is powered on, the power switch 540 immediately provides the supply voltage VDD and the ground level GND to the connector 510, and the detection device 520 detects whether the external device 20 is electrically coupled to the connector 510 (step S610). When it is determined in step S640 that the external device 20 is not electrically connected to the connector 510, the power switch 540 is controlled to stop powering the connector 510 or the external device 20. According to another embodiment of the invention, before step S610, when the electronic device 500 is powered on, the power switch 540 has not yet powered the connector 510. When it is determined in step S630 that the external device 20 is electrically connected to the connector 510, the control signal SC is then utilized to control the power switch 540 for powering the external device 20 via the connector 510.

The embodiment of the invention proposes a detection device and a detection method for detecting whether the M.2 device is electrically connected to the M.2 connector correctly. By connecting a detection device to any pin (i.e., the supply voltage pin or the ground pin), the function of detecting whether the M.2 device is electrically connected to the M.2 connector can be completed without sacrificing any pin. In addition, when it is determined that the M.2 device is not electrically connected to the M.2 connector, the power being provided to the M.2 connector and the M.2 device is stopped, which helps to reduce power consumption. Furthermore, the detection device and detection method proposed in the embodiments of the invention may also achieve the functions of hot plug and plug-and-play.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A detection device for detecting whether a device is electrically connected to a connector, wherein the connector comprises a first pin and a second pin, wherein the first pin and the second pin are physically separated and coupled to a first power respectively, wherein the detection device comprises:
    a first transistor, coupled between the first pin and the first power;
    a first resistor, coupled between a gate terminal of the first transistor and the first power, wherein a detection signal is generated at the gate terminal of the first transistor;
    a second transistor, coupled between the gate terminal of the first transistor and a second power; and
    a bias circuit, coupled between a gate terminal of the second transistor and the first pin.

2. The detection device as defined in claim 1, wherein the first power is a supply voltage, the second power is a ground level, the first transistor is a P-channel transistor, and the second transistor is an N-channel transistor.

3. The detection device as defined in claim 2, wherein the bias circuit comprises:
    a second resistor, coupled between the second power and the gate terminal of the second transistor; and
    a third resistor, coupled between the gate terminal of the second transistor and the first pin.

4. The detection device as defined in claim 3, wherein the first transistor and second transistor are turned off in response to a connection state indicating that a device is not electrically connected to the connector.

5. The detection device as defined in claim 4, wherein the ground level is provided to the gate terminal of the second transistor through the second resistor so as to turn off the second transistor, and the first resistor pulls the detection signal up to the supply voltage so as to turn off the first transistor.

6. The detection device as defined in claim 3, wherein the first transistor and second transistor are turned on in response to a connection state indicating that the device is electrically connected to the connector.

7. The detection device as defined in claim 6, wherein the supply voltage is divided by the second resistor and the third resistor through the first pin to turn on the second transistor, and the second transistor pulls the detection signal down to the ground level, wherein the first transistor is turned on according to the detection signal at the ground level.

8. The detection device as defined in claim 1, wherein the first power is a ground level, the second power is a supply voltage, the first transistor is an N-channel transistor, and the second transistor is a P-channel transistor.

9. The detection device as defined in claim 8, wherein the bias circuit comprises:
    a second resistor, coupled between the second power and the gate terminal of the second transistor, wherein the gate terminal of the second transistor is coupled to the first pin.

10. The detection device as defined in claim 9, wherein the first transistor and second transistor are turned off in response to a connection state indicating that the device is not electrically connected to the connector.

11. The detection device as defined in claim 10, wherein the supply voltage is provided to the gate terminal of the second transistor through the second resistor so as to turn off the second transistor, and the first resistor provides the ground level to the gate terminal of the first transistor and the detection signal so as to turn off the first transistor.

12. The detection device as defined in claim 9, wherein the first transistor and second transistor are turned on in response to a connection state indicating that the device is electrically connected to the connector.

13. The detection device as defined in claim 12, wherein the ground level is provided to the first pin and the gate terminal of the second transistor through the second pin and the device so as to turn on the second transistor according to the first pin at the ground level, and the gate terminal of the first transistor and the detection signal is pulled up to the supply voltage, wherein the first transistor is turned on according to the detection signal at the supply voltage.

14. The detection device as defined in claim 9, further comprising:
a fourth resistor, coupled between the second power and a source terminal of the second transistor, wherein a resistance value of the fourth resistor is less than a resistance value of the first resistor.

15. A detection method for detecting whether a device is electrically connected to a connector, wherein the detection method comprises:
detecting whether the device is electrically connected to the connector through one of a plurality of pins to generate a detection signal by a detection device;
determining whether the device is electrically connected to the connector according to the detection signal; and
controlling a power switch to power the device in response to a connection state between the device and the connector;
wherein the connector comprises a first pin and a second pin, wherein the first pin and the second pin are physically separated and coupled to a first power, wherein the detection device comprises:
a first transistor, coupled between the first pin and the first power;
a first resistor, coupled between a gate terminal of the first transistor and the first power, wherein a detection signal is generated at the gate terminal of the first transistor;
a second transistor, coupled between the gate terminal of the first transistor and a second power; and
a bias circuit, coupled between a gate terminal of the second transistor and the first pin.

16. The detection method as defined in claim 15, wherein the first power is a supply voltage, the second power is a ground level, the first transistor is a P-channel transistor, and the second transistor is an N-channel transistor.

17. The detection method as defined in claim 16, wherein the bias circuit comprises:

a second resistor, coupled between the second power and a gate terminal of the second transistor; and
a third resistor, coupled between the gate terminal of the second transistor and the first pin.

18. The detection method as defined in claim 17, wherein when the device is not electrically connected to the connector, the first pin and the second pin are physically separated so that the first pin is in a floating state, the ground level is provided to the gate terminal of the second transistor through the second resistor so as to turn off the second transistor, and the first resistor pulls the detection signal up to the supply voltage so as to turn off the first transistor.

19. The detection method as defined in claim 17, wherein when the device is electrically connected to the connector, the supply voltage is provided to the first pin through the second pin and the device, the supply voltage is divided by the second resistor and the third resistor through the first pin to turn on the second transistor, and the second transistor pulls the detection signal down to the ground level, wherein the first transistor is turned on according to the detection signal at the ground level.

20. The detection method as defined in claim 15, wherein the first power is a ground level, the second power is a supply voltage, the first transistor is an N-channel transistor, and the second transistor is a P-channel transistor.

21. The detection method as defined in claim 20, wherein the bias circuit comprises:
a second resistor, coupled between the second power and the gate terminal of the second transistor, wherein the gate terminal of the second transistor is coupled to the first pin.

22. The detection method as defined in claim 21, wherein when the device is not electrically connected to the connector, the first pin and the second pin are physically separated so that the first pin is in a floating state, the supply voltage is provided to the gate terminal of the second transistor through the second resistor so as to turn off the second transistor, and the first resistor provides the ground level to the gate terminal of the first transistor and the detection signal so as to turn off the first transistor.

23. The detection method as defined in claim 21, wherein when the device is electrically connected to the connector, the ground level is provided to the first pin and the gate terminal of the second transistor through the second pin and the device so as to turn on the second transistor according to the first pin at the ground level, and the gate terminal of the first transistor and the detection signal is pulled up to the supply voltage, wherein the first transistor is turned on according to the detection signal at the supply voltage.

* * * * *